Sept. 22, 1959 R. E. DIETZ 2,905,658
METHOD OF RECOVERING HYDROGENATED RUBBERY
POLYMERS IN CRUMB FORM
Filed Feb. 18, 1957
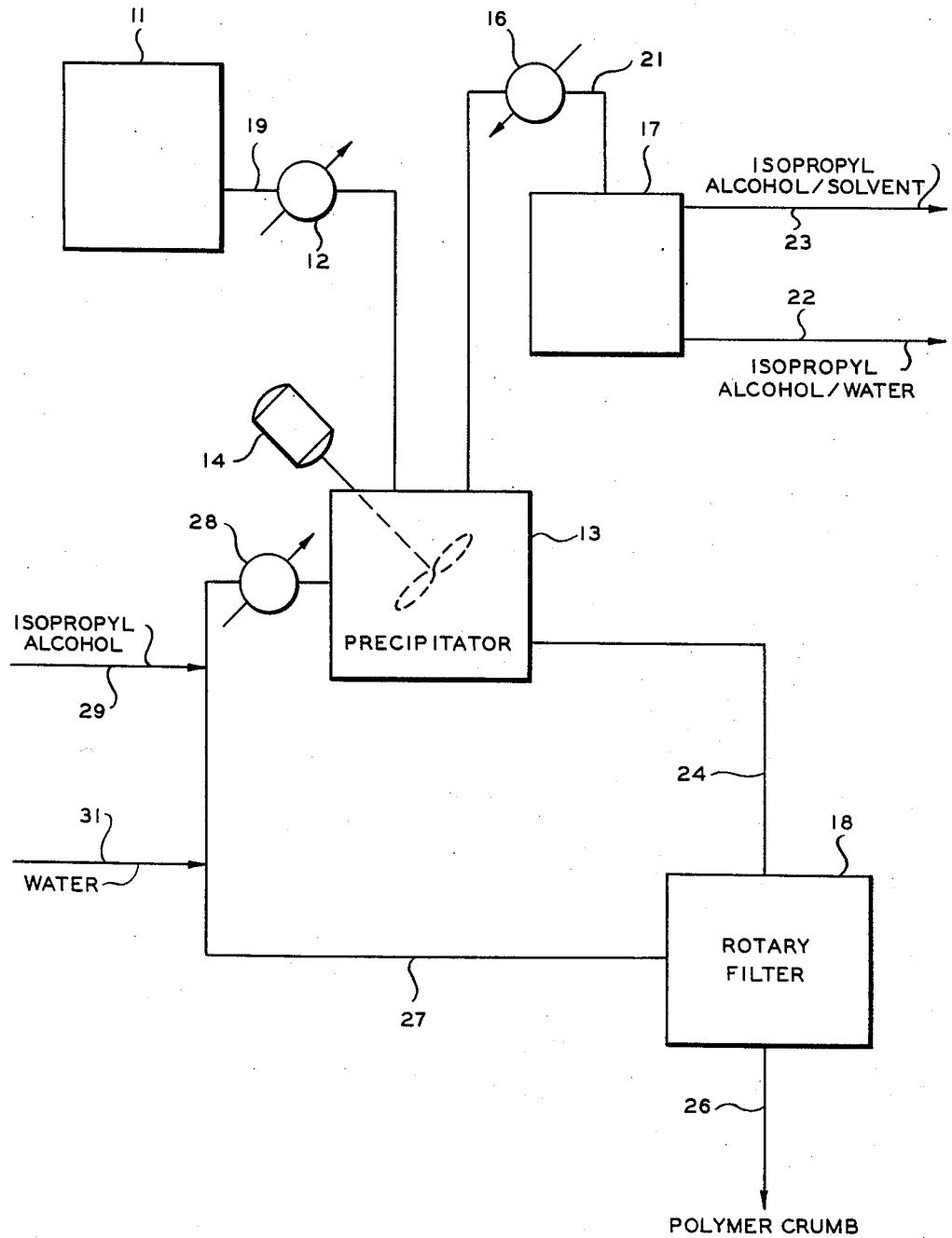
INVENTOR.
R.E. DIETZ
BY Hudson and Young
ATTORNEYS

United States Patent Office 2,905,658
Patented Sept. 22, 1959

2,905,658

METHOD OF RECOVERING HYDROGENATED RUBBERY POLYMERS IN CRUMB FORM

Richard E. Dietz, Bartlesville, Okla., assignor to Phillips Petroleum Company, a corporation of Delaware Application February 18, 1957, Serial No. 640,901

8 Claims. (Cl. 260—85.1)

This invention relates to a method of recovering hydrogenated rubbery polymers in crumb form.

In an application of R. V. Jones et al., Serial No. 395,291, filed November 30, 1953, there is disclosed a method for the production of hydrogenated polymers of butadiene. This material is also disclosed in Industrial and Engineering Chemistry, volume 45, No. 5, pages 1117–1122 (May 1953). It is known that the hydrogenated polymer can be recovered by adding alcohol. However, this causes the polymer to precipitate as a gelatinous mass and such a mass is difficult to wash and dry. If the material could be recovered as a non-agglomerated crumb as is synthetic rubber, subsequent handling would be greatly simplified.

I have discovered a method whereby the hydrogenated polymer can be recovered as the desired non-agglomerated crumb. The crumb is easily handled and can be readily dried in usual rubber handling equipment. In brief, this method comprises contacting a solution of the polymer, following removal of catalyst therefrom, with a mixture of isopropyl alcohol and water. From this solution, the ternary azeotrope of water, alcohol, and the solvent is removed and the polymer precipitates producing a slurry of non-agglomerated crumb. The crumb can be easily separated from this slurry and subsequently dried.

The following are objects of my invention.

An object of this invention is to provide an improved method of recovering hydrogenated rubbery polymers from solutions thereof. A further object of this invention is to provide a method for producing non-agglomerated hydrogenated rubber polymer. A further object of this invention is to provide a process for producing hydrogenated polybutadiene crumb.

Other objects and advantages of this invention will become apparent to one skilled in the art upon reading the accompanying disclosure, including a drawing which is a schematic representation of apparatus suitable for carrying out my invention.

In the references referred to in the first part of this disclosure, the hydrogenation is carried out in the presence of a nickel-kieselguhr catalyst. As disclosed in these references, the most desirable hydrogenated polymers contain an unsaturation within the range of zero to 50 percent, based upon the theoretical value of 100 percent for the unhydrogenated butadiene poymer. The resulting polymers are thermoplastic, and they possess unusually good low temperature properties.

Since these materials are thermoplastic, they are well suited for the preparation of articles by conventional extrusion or compression molding processes and they can also be processed by conventional compounding and vulcanizing techniques. When containing at least about 10 percent unsaturation, they can be vulcanized by means of the usual vulcanization agents and compounded and processed by methods known to the art using the usual fillers, plasticizers, tackifiers, softeners, accelerators, retarders, accelerator activators, etc. The new plastics of our invention can be used to make fibers, filaments, dishes, containers, films, sheetings, toys, gaskets, tubing, coating materials, protective coverings, white sidewalls for tires, and the like.

In the preferred process for preparing hydrogenated rubbery polymers of butadiene, the polymer is hydrogenated while dissolved in a suitable saturated cyclic hydrocarbon solvent. In the past, the hydrogenated polymer was removed from the hydrogenation reactor in solution, and the polymer was recovered from this solution by adding a precipitating agent such as an alcohol to the solution. While these hydrogenated rubbery polymers can be recovered by this process, precipitation of the hydrogenated polymer by such means results in the agglomeration of the precipitated polymer.

It is now discovered that hydrogenated rubbery polymers of butadiene can be recovered from solution in the form of non-agglomerated crumb by a process comprising contacting a solution of the polymer in a solvent with a mixture of isopropyl alcohol and water at a temperature above the boiling point of the ternary azeotrope of solvent-isopropyl alcohol-water.

The process of the present invention provides a method for recovering hydrogenated rubbery polymer of butadiene as a non-agglomerated crumb, said crumb being easily dried for packaging and shipment. This process is applicable for the recovery of these polymers which contain from zero to fifty, preferably from zero to twenty percent unsaturation based on one hundred percent theoretical unsaturation for the unhydrogenated rubbery polymer.

The present invention is applicable for recovering hydrogenated rubbery butadiene polymer from solutions in either cyclohexane or methylcyclohexane which contain up to ten percent by weight dissolved hydrogenated rubber polymer.

The amount of alcohol-water used in the practice of my invention is dependent upon two factors. It is necessary that there be sufficient water and isopropyl alcohol so that all of the solvent is removed as the ternary azeotrope and in addition sufficient liquid remaining, either water, alcohol, or a mixture thereof, to give a slurry of the polymer. Suitable slurries are obtained when the remaining liquid is at least equal to, on a weight basis, the amount of polymer.

During the contacting of the polymer solution with the isopropyl alcohol-water mixture, a sufficient agitation should be provided so as to insure complete contacting of the solution with the alcohol-water mixture. Suitable means for providing such agitation include stirrers and other means known in the art.

After the hydrogenated rubbery butadiene polymer is precipitated in the form of non-agglomerated crumb by contacting the polymer solution with the alcohol-water mixture, the polymer crumb can be recovered by filtration, decantation, or other suitable means. The polymer crumb can then be dried, preferably below about 150° F. and packaged for shipment or storage.

The drawing is a schematic representation of apparatus suitable for carrying out my invention although, obviously, different apparatus could be used. Continuous or batch-wise operation can be used. The principal elements shown are a hydrogenated polymer solution supply source 11, a heater 12, a precipitator vessel 13 provided with agitator 14, a cooler 16, an accumulator 17, and filter 18. Heater 12 is adapted to heat the polymer solution passed from supply vessel 11 to precipitator 13 by means of conduit 19. Vapors from precipitator 13 are passed to accumulator 17 by means of conduit 21 having cooler 16 therein. Accumulator 17 is provided with removal conduit 22 and removal conduit 23. Conduit 24 is provided to convey material to filter 18 from which solid material is recovered through conduit 26 and liquid material by means of conduit 27, conduit 27 extending to precipitator 13 and having heater 28 therein. Make-up isopropyl alcohol conduit 29 and make-up water conduit 31 communicate with conduit 27.

In the operation according to the process of my invention, a solution of hydrogenated rubbery butadiene polymer is contained in vessel 11, said solution containing generally approximately 5 percent by weight of the hydrogenated rubber and having the catalyst previously removed therefrom. Cyclohexane and methylcyclohexane are preferred solvents. The polymer solution passes from vessel 11 to precipitator 13 and is preferably heated to a temperature of approximately 165° F. although it may be any temperature between room temperature and the boiling point of the polymer solution. A mixture of isopropyl alcohol and water is maintained in precipitator 13. In preferred operation, the isopropyl alcohol-water mixture in vessel 13 is heated to a temperature above the boiling point of the ternary azeotrope of solvent, water, and isopropyl alcohol but below the boiling point of the alcohol-water azeotrope which is approximately 177° F. When methylcyclohexane is used as the polymer solvent, the temperature in precipitator 13 is preferably above 138° F. and, when cyclohexane is used, this temperature is generally above 148° F., the boiling point of the azeotropic mixture containing 74 weight percent cycloxehane, 18.5 weight percent water, and 7.5 weight percent isopropyl alcohol. Agitator 14 is provided so that there is intimate contact of the polymer solution and the alcohol-water mixture. When operating according to the preferred method of my invention, the ternary azeotrope of solvent-water-isopropyl alcohol flashes off as the polymer solution contacts the alcohol-water mixture, and the ternary azeotrope passes through conduit 21 to accumulator 17. In accumulator 17, two phases are formed, a hydrocarbon phase and an aqueous phase and these phases are withdrawn through conduits 23 and 22, respectively for separation and recovery of the components of the ternary azeotrope. As the ternary azeotrope is removed, the hydrogenated rubbery polymer is precipitated in the form of a non-agglomerated crum. This crumb is withdrawn as a slurry by means of conduit 24 and passed to filter 10. Preferably, the filter is a rotary Oliver filter although other filters can be used. The polymer crumb is removed by means of conduit 26 and passed to suitable drying means. The filtrate from filter 18 is passed by means of conduit 27 to precipitator 13, preferably by heating in heater 28. Since both isopropyl alcohol and water leave precipitator 13 as components of the ternary azeotrope with the solvent, make-up isopropyl alcohol and water are introduced into conduit 27 by means of conduits 29 and 31. Since the ternary azeotrope is richer in isopropyl alcohol than it is in water, the mixture in precipitator 13 tends to become richer in water and leaner in isopropyl alcohol. The rate of addition of make-up alcohol through conduit 29 is, therefore, greater in conduits 29 and 31 is dependent upon the rate of flow in conduti s29 and 31 is dependent upon the rate of flow of polymer solution from supply vessel 11 to precipitator 13.

The following examples illustrate my invention and show preferred modifications thereof although the broad invention should only be limited as set forth above.

Example I

Five hundred cubic centimeters of a mixture of isopropyl alcohol and water, containing 3 volumes of alcohol per volume of water, were charged to a three-necked flask fitted with an air-motor driven stirrer. Two hundred cubic centimeters of a methylcyclohexane solution of hydrogenated rubbery butadiene polymer, prepared by hydrogenation of emulsion-polymerized butadiene in the presence of a nickel-kieselguhr catalyst, were then charged dropwise to the flask directly over the stirrer impeller. The hydrogenated polymer contained approximately 8 percent residual unsaturation, based on 100 percent unsaturation of the unhydrogenated rubbery polymer, while the solution contained 4 to 5 percent by weight of dissolved hydrogenated rubbery butadiene polymer. The polymer solution was heated to 212° F. while the isoproyyl alcohol-water mixture was at room temperature. The methylcyclohexane-alcohol-water azeotrope boiled off as the polymer solution was added, and polymer immediately precipitated. The precipitated polymer was in the form of a fine, light crumb which did not agglomerate. The polymer was removed from the flask as a slurry in the alcohol-water mixture, separated from the liquid phase by filtration, and dried.

Example II

A run was carried out which was identical to that of Example I, except that methyl alcohol was substituted for the isopropyl alcohol. In this run, the polymer precipitated in a crumb, but this polymer crumb stuck to the container walls and to the stirrer. None of the polymer could be slurried.

Example III

A run was carried out according to the procedure of Example I, except that isopropyl alcohol alone was charged to the flask. As in the run of Example II, the polymer particles adhered to the walls of the flask.

Example IV

A still further run was carried out according to the procedure of Example I, except that the hydrogenated polymer contained eighteen percent unsaturation based on one hundred percent unsaturation for the unhydrogenated polymer. In this run, the polymer precipitated as a non-agglomerated crumb, and this polymer was recovered as a slurry in this isopropyl alcohol-water mixture.

Example V

A run was carried out according to the process of Example IV (eighteen percent residual unsaturation in the polymer), except that methyl alcohol alone was charged to the flask. The polymer in this run precipitated as a single, fibrous mass.

While these examples are all directed to the treatment of a rubbery homopolymer of butadiene, the invention is also applicable to recovery of other hydrogenated polymers. Furthermore, it is applicable to other polymer solvents although the particular temperatures will vary with each system. However, the invention is believed to be specific to the use of isopropyl alcohol since, as shown in the examples, suitable operation is not obtained when other alcohols are used. A preferred group of hydrogenated polymers are those disclosed in the above mentioned Jones et al. application, these being homopolymers of 1,3-butadiene and copolymers of 1,3-butadiene containing not over thirty percent by weight bound styrene.

As many possible embodiments can be made of this invention without departing from the scope thereof, it is to be understood that all matter herein set forth or shown in the accompanying drawing is to be interpreted as illustrative and not as unduly limiting the invention.

I claim:

1. The process of recovering in crumb form a hydrogenated polymer having a residual unsaturation of less than 50 percent selected from the group consisting of hydrogenated rubbery homopolymers of butadiene and hydrogénation rubbery copolymers of butadiene containing not over 30 percent by weight of bound styrene from a solution thereof in a solvent selected from the group consisting of cyclohexane and methylcyclohexane, comprising heating said solution to a temperature above the boiling point of a ternary azeotrope of water, isopropyl alcohol, and the selected solvent and below the boiling point of the polymer solution; introducing the heated solution into a mixture of isopropyl alcohol and water, the amount of isopropyl alcohol and water being at least sufficient to form a ternary azeotrope of water, isopropyl alcohol, and all of the selected solvent introduced in the polymer solution and to provide at least a 1:1 weight ratio of liquid polymer after removal of the azetrope; the temperature of said isopropyl alcohol-water mixture being not over 177° F.; removing the ternary azeotrope of isopropyl alcohol, water and the selected solvent; the removal of said ternary azeotrope causing the precipitation of the hydrogenated polymer forming a slurry of non-agglomerated crumb; and recovering said crumb from the resulting slurry.

2. The process of claim 1 wherein said hydrogenated polymer is a hydrogenated homopolymer of butadiene.

3. The process of claim 1 wherein said hydrogenated polymer is a hydrogenated copolymer of butadiene and styrene.

4. The process of recovering in crumb form hydrogenated polybutadiene, said polymer having a residual unsaturation of less than 50 percent from a solution thereof in methylcyclohexane comprising heating said solution to a temperature above 138° F. and below the boiling point of said solution; introducing said heated solution into a mixture of isopropyl alcohol and water, the temperature of said alcohol-water mixture being in the range of room temperature to 177° F.; the amount of said mixture being at least sufficient to form a ternary azeotrope of water, isopropyl alcohol, and all of the methylcyclohexane and to provide at least a 1:1 weight ratio of liquid to polymer after removal of the azetrope; removing the methylcyclohexane-alcohol-water azetrope; removing a slurry of non-agglomerated crumb in the resulting liquid; separating said crumb from said liquid; and drying said crumb.

5. The process of claim 4 wherein the residual unsaturation of the polymer is less than 20 percent.

6. The process of recovering in crumb form hydrogenated polybutadiene, said polymer having a residual unsaturation of less than 50 percent from a solution thereof in cyclohexane comprising heating said solution to a temperature above 148° F. and below the boiling point of said solution; introducing said heated solution into a mixture of isopropyl alcohol and water, the temperature of said alcohol-water mixture being in the range of room temperature to 177° F.; the amount of said mixture being at least sufficient to form a ternary azeotrope of water, isopropyl alcohol, and all of the cyclohexane and to provide at least a 1:1 weight ratio of liquid to polymer after removal of the azeotrope; removing the cyclohexane-alcohol-water azetrope; removing a slurry of non-agglomerated crumb in the resulting liquid; separating said crumb from said liquid; and drying said crumb.

7. The process of claim 6 wherein the residual unsaturation of the polymer is less than 20 percent.

8. The process of recovering in crumb form a hydrogenated polymer having a residual unsaturation of less than 50 percent selected from the group consisting of hydrogenated rubbery homopolymers of butadiene and hydrogenated rubbery copolymers of butadiene containing not over 30 percent by weight of bound styrene from a solution thereof in a hydrocarbon solvent selected from the group consisting of cyclohexane and methylcyclohexane comprising introducing said solution into a mixture of isopropyl alcohol and water, the amount of isopropyl alcohol and water being at least sufficient to form a ternary azeotrope of water, isopropyl alcohol, and all of said hydrocarbon solvent and to provide at least a 1:1 weight ratio of liquid to polymer after removal of the azetrope; removing the ternary azeotrope of isopropyl alcohol, water, and the selected solvent, the removal of said ternary azeotrope causing the precipitation of the hydrogenated polymer forming a slurry of non-agglomerated crumb; and recovering said crumb from the resulting slurry.

References Cited in the file of this patent

UNITED STATES PATENTS 2,691,647    Field et al. _____ Oct. 12, 1954